Patented Oct. 26, 1926.

1,604,471

UNITED STATES PATENT OFFICE.

DONALD ARCHER NIGHTINGALE, OF AMBLER, PENNSYLVANIA, ASSIGNOR TO THE KETOID COMPANY, OF WILMINGTON, DELAWARE, A CORPORATION OF DELAWARE.

MAKING CELLULOSE ESTERS OF CARBOXYLIC ACIDS.

No Drawing.   Application filed July 22, 1924.   Serial No. 727,487.

My invention relates to the manufacture of cellulose acetate.

The esterification of cellulose with acetic acid has been the object of many investigators and the value of such esters in industrial arts is well recognized but their availability has been hindered by the high cost of their production. In my copending application filed July 22, 1924, Serial Number 727,485 I have described my discovery that cellulose acetate can be formed rapidly and of great purity by bringing keten into contact with cellulose under proper conditions and I have also described as desirable the moistening of the cellulose with a liquid in which keten is soluble before bringing the keten into contact with the cellulose.

The moistening liquid may be a neutral liquid such as ether, a coal tar distillate (benzene or toluene) or crude or prepared petroleum distillates (benzine, kerosene, etc.) or mixtures of such liquids, or the cellulose may be moistened with acetic anhydride, the acyl radicle of which is the same as that formed on the cellulose molecule by the keten, or acetic acid may be used to moisten the cellulose and will be converted into the anhydride by contact with the keten.

Ketens may be recognized by the general formula $R=C=O$ where R represents an organic divalent radicle as in methyl keten $CH_3CH=C=O$, and keten $CH_2=C=O$. They all contain the group $=CO$.

The reaction between cellulose and keten is one of direct addition of the latter to an hydroxyl group of the cellulose molecule without simultaneous formation of water.

I have found it advisable to mix with the moistening liquid a condensing agent or catalyst in small amount, for example, zinc chloride, chlorsulphonic acid, sulphuric acid, etc.

I carry on my process in a closed chamber from which air is exhausted and to which, charged with cellulose moistened as described, keten is admitted. When esterification is complete to a desired degree the ester is removed from solution by addition of water, washed and dried at moderate temperature.

Example (A).

100 pounds of purified cotton are suspended in ether, 1,000 pounds of ether being a sufficient quantity to produce a satisfactory suspension. 10 pounds of benzenesulphonic acid is used as a catalyst. Keten is passed through the suspension until esterification is complete.

Example (B).

100 pounds of purified cotton are treated with 100 pounds of benzene containing in suspension 5 pounds of zinc chloride and is then suspended in 600 pounds of ether. Keten is then passed through the suspension until esterification is complete, the mass being stirred and maintained at a temperature below 30° C. during the treatment.

My process in its broad feature, and also as carried on with an acid or anhydride moistening agent is claimed in my copending application and what I desire to protect in this case is the process as carried on with a neutral moistening agent.

Having now described my invention, what I claim as new and desire to secure by Letters Patent, is:

1. The process of treating cellulose for the production of cellulose acetate comprising reacting upon cellulose with keten in the presence of a neutral liquid in which the keten is soluble.

2. The method of treating cellulose for the production of cellulose acetate which consists in moistening the cellulose with a neutral liquid in which the keten is soluble and reacting upon the so moistened cellulose with keten.

DONALD A. NIGHTINGALE.